United States Patent Office 3,186,824
Patented June 1, 1965

3,186,824
DEFOLIATING AND DESICCATING COMPOSITION AND METHOD
Albert L. Flenner, Wilmington, Del., assignor to E. I. du Pont de Nemours and Company, Wilmington, Del., a corporation of Delaware
No Drawing. Filed June 11, 1962, Ser. No. 201,317
2 Claims. (Cl. 71—2.3)

This application is a continuation-in-part of copending application Serial No. 833,709, filed August 14, 1959, now abandoned.

This invention relates to herbicides. It is more particularly directed to compositions comprising arylazomalononitriles formulated with organic compounds containing a carbonyl group, and methods for using these compositions for the defoliation and desiccation of plants.

The herbicidal activity of arylazomalononitriles is known and fully described in copending application Serial No. 749,325, filed July 18, 1958, now U.S. Patent No. 3,062,635. It has now been found that the contact action of these compounds as herbicides can be greatly enhanced by formulating them with organic compounds containing a carbonyl group. Typical of such organic compounds are N-methyl-2-pyrrolidone, N,N-dimethylformamide, N,N-dimethylacetamide and N-methylcaprolactam. Cyclohexanon, diisobutylketone and n-butyl acetate are also suitable if they are used in admixture with the former.

The arylazomalononitriles which can be thus formulated are of the formula $$X_n \text{—} \underset{Y}{\text{C}_6\text{H}_3} \text{—} N=N\text{—}C\underset{H}{\overset{CN}{\diagup}}\text{CN}$$

where:
X is hydrogen, a halogen radical, or an alkyl radical of from 1 to 4 carbon atoms,
Y is hydrogen, a halogen radical, a trifluoromethyl radical, or a nitro radical, and $n$ is 1 or 2.

The increased contact action obtained through the coaction of the arylazomalononitriles and the carbonyl-containing compounds produces defoliation and desiccation when these compositions are applied to plants. This increase is much greater than would be expected from formulating the arylazomalononitriles with conventional adjuvants.

The defoliation-desiccation phenomenon makes the harvesting of broadleaf agricultural crops a good deal easier by eliminating the need for manually removing green leaves and stems from the plants prior to harvest. Broadleaf crops suitable for such treatment are cotton, potatoes, soy beans, field beans, sugar beats and legume seed crops.

The foliage drying phenomenon makes the compositions most useful in the drying and harvesting of such crops as fescue, sugar cane, corn, rice and small grains such as wheat, oats, rye and barley. The compositions produce an accelerated rate of foliage drying when applied to these crops, thereby shortening the interval between the time the crop has stopped growing and seed harvest. The economic advantages of all this are apparent.

The arylazomalononitriles are prepared according to methods described by Schmidtman in Ber., 29, 1174 and Lythgoe, et al., in J. Chem. Soc., 1944, 315.

The compositions of this invention are formulated to contain at least one arylazomalononitrile, together with a compound containing a carbonyl group. These compositions can be either solid or liquid, and can be in any of the physical forms normally encountered in the agricultural chemical art. Thus, it is possible to prepare solutions, dusts, wettable powders, aqueous dispersions, emulsions and the like to meet the needs of any particular situation.

To prepare such compositions, conventional pest control adjuvants or modifiers are used. Suitable adjuvants and methods for formulating the compositions of this invention with them are disclosed in U.S. Patents 2,782,-112; 2,801,911; 2,843,470; 2,849,306; 2,854,375; and 2,895,817. The portions of these patents which describe agricultural adjuvants and methods for formulating compositions with them are hereby incorporated into this application by reference.

The compositions of this invention are preferably formulated as solutions. These are prepared quite simply by dissolving the arylazomalononitrile in any one or in a mixture of carbonyl-containing compounds.

The active component and the carbonyl-containing compound should be present in ratios of 1:4 to 4:1, respectively. Preferably, they should be present in ratios of from about 1:2 to 2:1.

The amount of active materials in the compositions of this invention will vary according to the type of plant being treated, the soil conditions, climatic factors, the degree of effect desired, and like factors. It is therefore not possible to indicate amounts suitable for all situations. Generally, however, the compositions are formulated to contain from about 0.5% to 95%, by weight, of active material.

The compositions are applied with conventional equipment. They are sprayed onto the foliage of the plant to be treated until the foliage is wet. The actual amount of active ingredients used in such applications can, of course, vary over a wide range according to need. Generally speaking, rates of from 0.5 to 4 pounds per acre are satisfactory.

The compositions are most advantageously applied to plants when the plants are ripe and ready for harvesting. With cotton, for example, the plants are sprayed when the bolls are ripe and ready to open. After treatment, all of the bolls, especially those on the lower part of the plant, are exposed to the sun until they are completely dry. They can then be picked efficiently by hand or machine.

In order that this invention be better understood, the following examples are submitted:

*Example 1*

One pound of m-chlorophenylazomalononitrile is combined with one pound of N-methyl-2-pyrrolidone, to give a clear solution. This solution is then diluted with 8 gallons of diesel oil, 90% of which is distillable at atmospheric pressure and 675° F., to give a composition ready for spray application.

This composition is applied from the air at a volume of ten gallons per acre to a field of cotton about two weeks before harvest. One week after treatment, the leaves of the cotton plants are desiccated while the bolls have matured normally. Harvesting by mechanical strippers is thus facilitated and there is no discoloration of the lint by green leaf tissue.

*Example 2*

Two pounds of p-chlorophenylazomalononitrile are dissolved in two pounds of N-methyl-2-pyrrolidone. This is then diluted with 15 gallons of No. 2 fuel oil, a diesel oil 90% of which is distillable at atmospheric pressure and 675° F.

The diluted solution is applied at the rate of 15 gallons per acre to a field of cotton in the late boll stage, using a high clearance ground sprayer with drop nozzles. The leaves of the cotton plants wilt quickly, and several days later are abscissed or desiccated. This greatly reduces the incidence of boll rot and facilitates harvesting of unstained superior quality lint by mechanical pickers.

*Example 3*

Two pounds of m-chlorophenylazomalononitrile are dissolved in eight pounds of N,N-dimethylacetamide. This is then diluted to a total of ten gallons with diesel oil.

The diluted solution is applied directly, at the rate of ten gallons per acre, to potato vines two weeks before harvest, using a tractor-mounted pressure sprayer with nozzles mounted on a horizontal boom. The potato foliage and late weeds and grasses are killed and mechanical harvesting is greatly facilitated.

*Example 4*

One pound of 2,4,5-trichlorophenylazomalononitrile is dissolved in three pounds of N,N-dimethylformamide. This solution is then diluted with nine gallons of diesel fuel.

This diluted solution is applied by airplane to a weedy stand of soy beans at the rate of ten gallons per acre. Wilting of the bean foliage and weeds is noted the following day, gradually resulting in leaf desiccation or leaf drop. Ripening of the beans is quickened and combining (harvesting) is facilitated with minimum interference from unwanted leaf growth.

*Example 5*

Fourteen and one-half pounds of phenylazomalononitrile are combined with 4.8 pounds of diisobutyl ketone and 9.6 pounds of N-methyl-2-pyrrolidone. This solution is further diluted with 29 pounds of a paraffinic spray oil containing three pounds of polyoxyethylene sorbitol hexaoleate. This solution is added to 110 gallons of water and agitated vigorously to give an oil-in-water emulsion.

The emulsion is applied at the rate of 30 gallons per acre, by pressure sprayer, to a mixed stand of weeds infesting the area around oil storage tanks. One week after treatment the vegetation is killed, thus greatly reducing fire hazard during the ensuing season.

*Example 6*

One pound of m-trifluoromethylphenylazomalononitrile is dissolved in two pounds of N,N-dimethylacetamide and then further diluted with two pounds of No. 2 fuel oil containing 0.4 pound of polyethylene glycol 400 dioleate. This solution is added to 7.5 gallons of water and agitated vigorously to given an oil-in-water emulsion.

The emulsion is applied at the rate of 30 gallons per acre to a mixed growth of grass and broad-leaf weeds in an area along a fence line. One to two weeks after treatment the plant foliage is killed and no mowing or other vegetation control is required for several weeks.

*Example 7*

Two pounds of m-nitrophenylazomalononitrile are dissolved in two pounds of n-butyl acetate and two pounds of N-methyl-2-pyrrolidone and then further diluted with 15 gallons of fuel oil. The diluted composition is applied from a helicopter at the rate of 15 gallons per acre to an area around a military installation to control a mixture of annual and perennial weeds. The vegetation is desiccated shortly after treatment.

*Example 8*

The emulsion of Example 6 is applied at the rate of ten gallons per acre to a field of perennial rye grass about two weeks before the seed is harvested. The desiccation of the rye grass foliage as well as the foliage of any weeds present is hastened, thus facilitating the harvesting of the rye seed.

*Example 9*

One pound of m-chlorophenylazomalononitrile is dissolved in one pound of N-methyl-2-pyrrolidone and then converted to an oil-in-water emulsion by the method described in Example 6.

The emulsion is applied at the rate of 30 gallons per acre to a field of sugar cane shortly before harvest. Desiccation of the foliage is hastened, and the stripping of foliage before extraction of the cane syrup is thus facilitated.

The embodiments of the invention in which an exclusive property or privilege is claimed are:

1. A method for the defoliation and desiccation of plants which are ripe and ready for harvesting, said method comprising applying to the plant to be treated, a defoliating and desiccating amount of a composition comprising one part by weight of an arylazomalononitrile of the formula

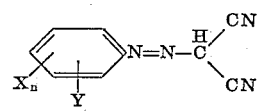

where:

X is selected from the group consisting of hydrogen, halogen, and alkyl containing from 1 to 4 carbon atoms, Y is selected from the group consisting of hydrogen, halogen, trifluoromethyl, and nitro, and $n$ is a whole positive number less than 3, formulated with 0.25 to 4 parts by weight of a compound selected from the group consisting of N-methyl-2-pyrrolidone, N,N-dimethylformamide, N,N-dimethylacetamide and N-methylcaprolactam.

2. A composition for the defoliation and desiccation of plants comprising a defoliating and desiccating amount of a composition comprising one part by weight of a compound of the formula:

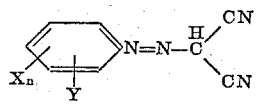

where:

X is selected from the group consisting of hydrogen, halogen, and alkyl containing from 1 to 4 carbon atoms, Y is selected from the group consisting of hydrogen, halogen, trifluoromethyl and nitro, and $n$ is a whole positive number less than 3, and 0.25 to 4 parts by weight of a compound selected from the group consisting of N-methyl-2-pyrrolidone, N,N-dimethylformamide, N,N-dimethylacetamide and N-methylcaprolactam.

References Cited by the Examiner

UNITED STATES PATENTS

| | | | |
|---|---|---|---|
| 2,792,296 | 5/57 | Heininger | 71—2.3 |
| 2,961,798 | 11/60 | Wells | 71—2.1 |
| 3,062,635 | 11/62 | Acker et al. | 71—2.3 |

OTHER REFERENCES

Frear: Chemistry of the Pesticides, D. Van Nostrand Co., Inc., New York, third ed. (1955), pages 422 to 428.

Gast et al.: Agricultural Chemicals, vol. 11, No. 4, April 1956, pages 42 to 45, 136 and 137.

LEWIS GOTTS, *Primary Examiner.*

JULIAN S. LEVITT, *Examiner.*